Patented Nov. 24, 1942

2,302,753

UNITED STATES PATENT OFFICE 2,302,753

PRINTING OF ESTER SALTS OF LEUCO VAT DYESTUFFS

Jacques Duport, Basel, Switzerland, assignor to the firm of Durand & Huguenin S. A., Basel, Switzerland No Drawing. Application October 28, 1940, Serial No. 363,235. In Germany August 31, 1939

15 Claims. (Cl. 8—70)

Certain alkaline salts of sulphuric acid esters of leuco vat dyestuffs, such as they can for instance be obtained according to U. S. Patent 1,448,251, show an insufficient solubility in water, whereby their application in textile printing is very much impeded or even rendered impossible.

It is well known that amongst such sulphuric acid esters of leuco vat dyestuffs, whose alkaline salts are difficultly soluble in water, there are also some salts with other bases, such as for instance with di- or triethanolamine, which are much easier to be dissolved (see U. S. Patent 1,954,702).

In order to get these salts, one can prepare the free ester acid and convert the same afterwards with the base, for instance with triethanolamine. Such a process ought to be hardly practicable technically, because the free ester acids are very apt to decompose.

The above mentioned salts can also be made by causing an ester salt of an easily volatile organic base to react with the non-volatile triethanolamine base. This way is practicable technically, because when producing the leuco sulphonic acid esters the same appear as dimethylaniline salts or as pyridine salts, i. e. as salts of a volatile organic base. These di- or triethanolamine salts of the leuco sulphuric acid esters can, however, hardly be made in powder form, but only in form of a paste. There will, therefore, arise difficulties in the packing, handling and dosing of these products.

In U. S. Patent 1,954,702 there is further mentioned that the addition of di- or triethanolamine in form of the free bases to the commercial dyestuff (sodium salt) has the effect that products are obtained which are better soluble. Under these circumstances these bases act obviously simply as solvents, such as for instance glycerine and others. The use of an excess of the base in order to obtain a better solutioning of the ester salt would not be practical in many cases, as the dosing of the acid, which is necessary for the development of the dyeing, and of the oxidising agent will thereby be rendered difficult.

A completely surprising observation has now been made that the difficultly soluble (and therefore useless in printing) alkaline salts of certain leuco sulphuric acid esters yield good and even prints as soon as one adds to the printing paste some salts of di- or triethanolamine with inorganic acids, especially with strong inorganic acids, such as hydrochloric acid, sulphuric acid etc. A process based on this observation offers a considerable technical advantage.

Instead of the triethanolamine salts of the leuco esters in paste form, the corresponding dry, handy, easily dosable and easily manufacturable alkaline salts in powder form can be used. A concomitant use of an excess of organic base, which may be hindering, does not come into consideration. The salt of the organic base can be added in solution or in powder form.

As organic bases, whose salts can be used in the present process, may be cited the hydroxyalkylamines, therefore for instance the diethanolamine, the triethanolamine, furthermore the condensation product of ethylene oxide with triethanolamine and others.

The improved process is illustrated, but not limited, by the following examples:

Example 1

Cotton is printed with a printing paste of the following composition:

|  | Grams |
|---|---|
| Sodium salt of the sulphuric acid ester of leuco-dibromo-anthranthrone | 2 |
| Urea | 1 |
| Phenol | 1 |
| Ethylene-thioglycol | 2 |
| Solution of the sulphate of triethanolamine with a strength of 50% of base | 4 |
| Hot water | 27 |
| Neutral starch-tragacanth thickening | 55 |

There is then heated for a short time on the water-bath, cooled down again to room temperature and added:

| | |
|---|---|
| Sodium chlorate solution of 33% strength | 3 |
| Ammonium sulphocyanide solution of 50% strength | 3 |
| Ammonium vanadate solution of 1% strength | 1 |
| Ammonia solution of 20% solution | 1 |
| | 100 |

Afterwards, there is steamed for 8 minutes in the Mather & Platt, rinsed, soaped at the boil, rinsed and dried.

The above mentioned solution of the triethanolamine sulphate is prepared as follows: 50 parts by weight of triethanolamine are mixed with 31 parts of water and approximately 19 parts of concentrated sulphuric acid of 66° Bé. till the solution just reacts neutral on litmus paper.

The shades obtained according to this example are even and completely developed. Without the addition of triethanolamine sulphate considerably weaker dyeings are obtained.

*Example 2*

Cotton is printed with a printing paste of the following composition:

| | Grams |
|---|---|
| Sodium salt of the sulphuric ester of leuco-dibromoanthanthrone | 2 |
| Urea | 1 |
| Phenol | 1 |
| Ethylene thioglycol | 2 |
| Solution of the sulphate of triethanolamine with a strength of 50% of the base | 4 |
| Hot water | 33 |
| Neutral starch-tragacanth thickening | 55 |
| Solution of sodium carbonate of 10% strength | 2 |
| | 100 |

The printed fabric is dried. The dyeing is developed by a passage of about 5 seconds at 35° C. in a bath containing:

| | Grams |
|---|---|
| Bichromate of potassium | 30 |
| Concentrated sulphuric acid per litre of water | 72 |

There is then squeezed out, given an air passage of 30 seconds, then rinsed in the open width, neutralised with a carbonate of soda solution and soaped at the boil.

Without the addition of triethanolamine solution, less intense dyeings are obtained.

*Example 3*

Cotton is printed with a printing paste of the following composition:

| | Grams |
|---|---|
| Sodium salt of the sulphuric acid ester of the leuco compound of 7.7'-dimethyl-5.5'-dichlorothioindigo | 6 |
| Urea | 4 |
| Phenol | 2 |
| Solution of the sulphate of the trioxyethyl-ether of triethanolamine with a strength of 50% of base | 8 |
| Hot water | 17 |
| Neutral starch-tragacanth thickening | 50 |
| Sodium chlorate solution of 33% strength | 5 |
| Ammonium sulphocyanide solution of 50% strength | 6 |
| Ammonium vanadate solution of 1% strength | 1 |
| Ammonium solution of 20% strength | 1 |
| | 100 |

There is then steamed for 8 minutes in the Matter & Platt, rinsed, soaped at the boil, rinsed and dried.

The solution of the sulphate of the trioxyethyl-ether of triethanolamine is prepared as follows: 50 parts by weight of the trioxyethyl-ether of triethanolamine are mixed with 42.3 parts of water and approximately 7.7 parts of concentrated sulphuric acid 66° Bé. until the solution just reacts neutral on litmus paper.

According to this example intense and well developed dyeings are obtained, whereas those prepared without the addition of the sulphate of the trioxyethyl-ether of triethanolamine turn out considerably weaker.

*Example 4*

Cotton is printed with a printing paste of the following composition:

| | Grams |
|---|---|
| Sodium salt of the sulphuric acid ester of the leuco-compound of the vat dyestuff according to Example 3 of the German Patent No. 301,554, containing 46% of dyestuff | 4 |
| Hot water | 21 |
| Ethylenethioglycol | 10 |
| Solution of the sulphate of the trioxyethyl-ether of triethanolamine, containing 50% of base (see Example 2) | 6 |
| Starch-tragacanth thickening neutralised with ammonia | 55 |
| Sodium chlorate solution of 33% strength | 2 |
| Ammonium sulphocyanide solution of 50% strength | 0.5 |
| Ammonium vanadate solution of 1% strength | 0.5 |
| Ammonia solution of 20% strength | 1 |
| | 100 |

There is steamed for 8 minutes, rinsed afterwards, soaped at the boil, rinsed and dried.

An intense, level, red violet dyeing will be obtained, which is considerably stronger than one obtained without the use of the sulphate of the trioxyethyl-ether of triethanolamine.

*Example 5*

The following printing paste is prepared:

| | Grams |
|---|---|
| Sodium salt of the sulphuric acid ester of the leuco compound of the vat dyestuff according to Example 3 of the German Patent No. 301,554, containing 46% of dyestuff | 4 |
| Urea | 2 |
| Phenol | 2 |
| Ethylene-thioglycol | 4 |
| Solution of the sulphate of the triethanolamine containing 50% of base | 4 |
| Hot water | 24 |
| Neutral starch-tragacanth thickening | 55 |
| Solution of sodium nitrite of 30% strength | 3 |
| Solution of sodium carbonate | 2 |
| | 100 |

There is printed on cotton, dried and aged for 4 minutes in the Mather & Platt. The dyeing is finally developed by a passage of about 8 seconds at 70° C. After a short air passage there is rinsed, neutralised and soaped at the boil.

Also in this case a more intense shade is obtained compared with a shade obtained without the use of the sulphate of triethanolamine.

What I claim is:

1. A process of printing textile fibres, which comprises applying to the textile fibres a printing paste containing an alkali ester salt of a leuco vat dyestuff, a thickening agent, an oxidising agent and a salt of an inorganic acid with an alkylamine, bearing hydroxy groups.

2. A process of printing textile fibres, which comprises applying to the textile fibres a printing paste containing a difficultly soluble alkali ester salt of a leuco vat dyestuff, a thickening agent, an oxidising agent and a salt of an inorganic acid with an alkylamine, bearing hydroxy groups.

3. A process of printing textile fibres, which comprises applying to the textile fibres a printing paste containing an alkali ester salt of a leuco vat dyestuff, a thickening agent, an oxidising agent and a salt of triethanolamine with an inorganic acid.

4. A process of printing textile fibres, which comprises applying to the textile fibres a printing paste containing an alkali ester salt of a leuco vat dyestuff, a thickening agent, an oxidising agent and a salt of diethanolamine with an inorganic acid.

5. A process of printing textile fibres, which comprises applying to the textile fibres a printing paste containing an alkali ester salt of a leuco vat dyestuff, a thickening agent, an oxidising agent and a salt of the trihydroxyethylether of triethanolamine with an inorganic acid.

6. A process of printing textile fibres, which comprises applying to the textile fibres a printing paste containing an alkali ester salt of a leuco vat dyestuff, a thickening agent, an oxidising agent and the sulphate of an alkylamine, bearing hydroxy groups.

7. A process of printing textile fibres, which comprises applying to the textile fibres a printing paste containing an alkali ester salt of a leuco vat dyestuff, a thickening agent, an oxidising agent and the sulphate of the trioxyethylether of the triethanolamine.

8. A printing composition containing an alkali ester salt of a leuco vat dyestuff, a thickening agent, an oxidising agent and a salt of an inorganic acid with an alkylamine, bearing hydroxy groups.

9. A printing composition containing a difficultly soluble alkali ester salt of a leuco vat dyestuff, a thickening agent, an oxidising agent and a salt of an inorganic acid with an alkylamine, bearing hydroxy groups.

10. A printing composition containing an alkali ester salt of a leuco vat dyestuff, a thickening agent, an oxidising agent and a salt of triethanolamine with an inorganic acid.

11. A printing composition containing an alkali ester salt of a leuco vat dyestuff, a thickening agent, an oxidising agent and a salt of diethanolamine with an inorganic acid.

12. A printing composition containing an alkali ester salt of a leuco vat dyestuff, a thickening agent, an oxidising agent and a salt of the trihydroxyethylether of triethanolamine with an inorganic acid.

13. A printing composition containing an alkali ester salt of a leuco vat dyestuff, a thickening agent, an oxidising agent and the sulphate of an alkylamine, bearing hydroxy groups.

14. A printing composition containing an alkali ester salt of a leuco vat dyestuff, a thickening agent, an oxidising agent and the sulphate of the trioxyethylether of triethanolamine.

15. A dyestuff composition adapted for use in printing textile fibres, containing an alkali ester salt of a leuco vat dyestuff, a thickening agent, an oxidising agent and a salt of an inorganic acid with an alkylamine bearing hydroxy groups.

JACQUES DUPORT.